United States Patent [19]
Ein-Eli et al.

[11] Patent Number: 5,994,000
[45] Date of Patent: Nov. 30, 1999

[54] ASYMMETRIC ORGANIC ALKYL METHYL CARBONATES FOR NON-AQUEOUS POWER SOURCES

[75] Inventors: Yair Ein-Eli, Waltham; Richard Laura, Melrose, both of Mass.

[73] Assignee: Covalent Associates, Inc., Woburn, Mass.

[21] Appl. No.: 09/001,450

[22] Filed: Dec. 31, 1997

[51] Int. Cl.[6] .......................... H01M 10/40; H01G 9/02
[52] U.S. Cl. .......................... 429/332; 429/342; 361/504
[58] Field of Search .................................. 429/332, 342; 361/504

[56] References Cited

U.S. PATENT DOCUMENTS

| | | | |
|---|---|---|---|
| 5,451,477 | 9/1995 | Omaru et al. | 429/342 X |
| 5,474,862 | 12/1995 | Okuno et al. | 429/332 |
| 5,521,027 | 5/1996 | Okuno et al. | 429/332 |
| 5,571,635 | 11/1996 | Shu et al. | 429/194 |
| 5,633,099 | 5/1997 | Yokoyama et al. | 429/332 |
| 5,650,244 | 7/1997 | Shoji et al. | 429/342 X |
| 5,766,797 | 6/1998 | Crespi et al. | 429/332 |

FOREIGN PATENT DOCUMENTS

| | | | |
|---|---|---|---|
| 714148 A1 | 5/1996 | European Pat. Off. | H01M 0/10 |
| 757399 A1 | 2/1997 | European Pat. Off. | H01M 0/10 |
| 07249432 A2 | 9/1995 | Japan | H01M 0/10 |
| 07296848 A2 | 11/1995 | Japan | H01M 0/04 |
| 07326385 A2 | 12/1995 | Japan | H01M 0/10 |
| 08007923 A2 | 1/1996 | Japan | H01M 0/10 |
| 08045544 A2 | 2/1996 | Japan | H01M 0/10 |
| 08078052 A2 | 3/1996 | Japan | H01M 0/10 |
| 08115742 A2 | 5/1996 | Japan | H01M 0/10 |
| 08138733 A2 | 5/1996 | Japan | H01M 0/10 |
| 08171934 A2 | 7/1996 | Japan | H01M 0/10 |
| 08293324 A2 | 11/1996 | Japan | H01M 0/10 |
| 08298134 A2 | 11/1996 | Japan | H01M 0/10 |
| 08306387 A2 | 11/1996 | Japan | H01M 0/06 |
| 8-306364 | 11/1996 | Japan | H01M 6/16 |
| WO 96 41801 | 12/1996 | WIPO | C07D 317/38 |

*Primary Examiner*—Stephen Kalafut
*Attorney, Agent, or Firm*—Weingarten, Schurgin, Gagnebin & Hayes LLP

[57] ABSTRACT

Acyclic, asymmetric methyl alkyl carbonates, particularly for use with a carbonaceous, e.g., graphite, anode, in electrolytes suitable for portable power sources, are disclosed. Asymmetric alkyl carbonate solvents, having the general structural formula MeO—$CO_2$R, where R is larger than methyl, can be used as the only solvent in the non-aqueous electrolyte of a portable power source; no other solvent is necessary for superior performance in, e.g., high energy density lithium ion batteries or high power electrochemical capacitors. Furthermore, an asymmetric alkyl methyl carbonate can serve as the primary solvent for a non-aqueous electrolyte, i.e., the solvent providing the requisite properties, with the appropriate volume balance being made up with a combination of cyclic and acyclic carbonates or esters chosen for a particular application.

22 Claims, 8 Drawing Sheets

Conductivity values in mS/cm of 1M LiAsF6, 1M LiPF6, 1M Li methide and 1M Li imide all in EMC:EC (3:1), taken as a function of temperature.

ASYMMETRIC ORGANIC ALKYL METHYL CARBONATES FOR NON-AQUEOUS POWER SOURCES

STATEMENT REGARDING FEDERALLY SPONSORED RESEARCH OR DEVELOPMENT

Part of the work leading to this invention was carried out with United States government support provided under National Institutes of Health Grant Number 1 R43 HL57679-01. Therefore, the U.S. government has certain rights in this invention.

BACKGROUND OF THE INVENTION

1. Field of the Invention

The present invention relates to a high energy, non-aqueous portable power source such as a high energy density battery or high power electrochemical capacitor, and more particularly, to a high energy, non-aqueous portable power source comprising novel asymmetric alkyl carbonate-based electrolytes which afford improved cycle life, high capacity, and superior low temperature performance.

2. Description of the Prior Art

Non-aqueous electrolytes formulated specifically for application in electrochemical devices optimally possess a variety of desirable qualities, as described in a recent review article by Gores, et al. (1). The authors cite low temperature performance and electrochemical stability as two key requirements for both non-aqueous batteries and capacitors, but do not teach how these requirements may be achieved.

U.S. Pat. No. 5,525,443 (2) discloses a non-aqueous rechargeable lithium ion battery comprising a complex oxide containing lithium, a carbonaceous anode material, and a mixed solvent electrolyte consisting of a lithium salt and a binary blend of a cyclic and acyclic organic carbonate solvent. This patent teaches that in order to maintain electrolyte liquid at $-20°$ C., a mixing ratio of acyclic to cyclic organic carbonate must be in the range of 1 to 4. Solvent combinations outside this ratio form solids at $-20°$ C. which is deleterious to both the capacity and cycle life of the battery.

U.S. Pat. No. 5,474,862 (3) claims the advantage of low temperature performance in lithium ion batteries employing non-aqueous electrolytes comprising a tertiary blend of a cyclic organic carbonate solvent, an acyclic organic carbonate solvent, and an acyclic ester solvent represented by the formula $RCO_2R'$. The tertiary combination of organic solvents to give battery electrolytes that perform well at low temperature appears to have been determined empirically. Japanese Kokai application No. JP 08115742 A2 (4) discloses low temperature electrolytes for lithium ion batteries are claimed. These electrolytes consist of a lithium salt, an acyclic carbonate, and at least 10–100 vol % of chloroethylene carbonate.

SUMMARY OF THE INVENTION

In order to gain an understanding as to how non-aqueous solvents interact with each other, and with a carbonaceous, e.g., graphite, anode, in electrolytes suitable for portable power sources, we have synthesized and tested new acyclic, asymmetric alkyl carbonates, especially those with the general structural formula of $MeO—CO_2R$, where R is larger than methyl. Our results indicate unexpectedly that an asymmetric alkyl methyl carbonate can be used as the only solvent in the non-aqueous electrolyte of a portable power source; no other solvent is necessary for superior performance in, e.g., high energy density lithium ion batteries or high power electrochemical capacitors. Furthermore, an asymmetric alkyl methyl carbonate can serve as the primary solvent for a non-aqueous electrolyte, i.e., the solvent providing the requisite properties, with the appropriate volume balance being made up with a combination of cyclic and acyclic carbonates or esters chosen for a particular application. We have also determined that, whether as the sole solvent or as the primary solvent in combination with other organic solvents, asymmetric alkyl methyl carbonates provide important low temperature stability for electrolytes for portable power sources.

For lithium ion battery applications, an asymmetric alkyl methyl carbonate (or a combination of two or more asymmetric alkyl methyl carbonates) must serve either as the single solvent for the electrolyte or as the primary solvent in a proportion of at least 10 vol %, with the balance of the electrolyte containing one or more cyclic or acyclic alkyl carbonates or esters and a suitable lithium ion containing organic or inorganic salt. For electrochemical capacitor applications, the restriction requiring at least 10 vol % of an alkyl methyl carbonate in the electrolyte does not apply.

The benefits of low temperature performance and high electrochemical stability are intrinsic to the chemical structure of an asymmetric alkyl methyl carbonate solvent.

In other words, different chemical functionalities, which are deliberately synthesized into the same asymmetric alkyl methyl carbonate molecule, directly enhance the electrochemical performance of portable power sources such as batteries and capacitors. We have discovered that the presence of the MeO— (methoxy) group on an organic carbonate solvent molecule in the electrolyte is critically important to the stability and reproducibility of the Li+ intercalation/deintercalation process undergone by the carbonaceous anode material used in lithium ion batteries.

In other words, if one were to substitute a longer chain alkyl group (such as ethoxy, propoxy, butoxy, etc.) for the methoxy group, the resulting compound would not be able to function as the single solvent of the electrolyte. We believe that reason for this result lies in the poor interfacial film formation ability of any but MeO-based alkyl carbonate solvents when a lithium ion battery is subjected to charge.

We have also discovered that certain alkyl group functionalities, when incorporated into the asymmetric alkyl methyl carbonate solvent molecule, dramatically lower the freezing point of that particular solvent. Such functionalities involve both linear, branched, and cyclic alkyl groups comprised of two or more carbon atoms. Some typical examples of these groups include, but are not limited to, ethyl, n-propyl, iso-propyl, n-butyl, iso-butyl and sec-butyl. The reason for the low solvent freezing points of asymmetric organic carbonate solvents lies in the inability of asymmetric alkyl carbonate solvent molecules to properly pack which, in turn, retards the formation of crystallites at low temperatures, thereby precluding the facile transition from the liquid state to the solid state.

The preferred solvents and solvent combinations for use in the non-aqueous electrolytes of the invention are indicated below.

In one aspect, the non-aqueous electrolyte of the invention comprises an appropriate salt and a non-aqueous organic solvent consisting of one or more asymmetric alkyl methyl carbonates, each having no more than six carbon atoms, which include, but are not limited to, the following structures: $MeO—CO_2R$, where R=ethyl, propyl, iso-propyl, butyl, iso-butyl and sec-butyl. In another aspect, for use in lithium ion batteries, the one or more asymmetric alkyl methyl carbonates must form at least 10 vol % of the electrolyte, with the remainder of the electrolyte being made up of any other (or combination of) cyclic or acyclic, symmetric or asymmetric alkyl carbonate or ester; preferably, this secondary solvent is ethylene carbonate, propylene carbonate or butylene carbonate. The alkyl carbonates are of the form $ROCO_2R'$, where R and $R'=C_{1-4}$; the alkyl esters are of the form $RCO_2R'$, where $R=C_{0-4}$ and $R'=C_{1-4}$. For lithium ion battery applications, a lithium salt or combination of lithium salts must be included in the electrolyte formulation; examples of suitable salts include $LiBF_4$, $LiPF_6$, $(CF_3SO_2)_2NLi$ and $(CF_3SO_2)_3CLi$. For electrochemical capacitor applications, a non-lithium salt or combination of non-lithium salts must be included in the electrolyte formulation; examples of suitable salts include 1-ethyl-3-methyl imidazolium $BF_4(EMIBF_4)$, EMIPF6, $(CF_3SO_2)_2NEMI$, and $(CF_3SO_2)_3CEMI$.

Other features and advantages of the invention will be apparent from the following description of the preferred embodiments thereof and from the claims, taken in conjunction with the following drawings.

BRIEF DESCRIPTION OF THE DRAWINGS

FIG. 2a, $MeO$—$CO_2Et$; FIG. 2b, $MeO$—$CO_2Pr$; FIG. 2c, $MeO$—$CO_2iPr$; FIG. 2d, $MeO$—$CO_2Bu$;

FIG. 3a shows the destruction of cycling capacity with different asymmetric alkyl ethyl carbonate electrolytes; FIG. 3b shows the restoration of cycling capacity with increasing proportions of an asymmetric alkyl methyl carbonate.

DETAILED DESCRIPTION OF THE INVENTION

Figure 1A:
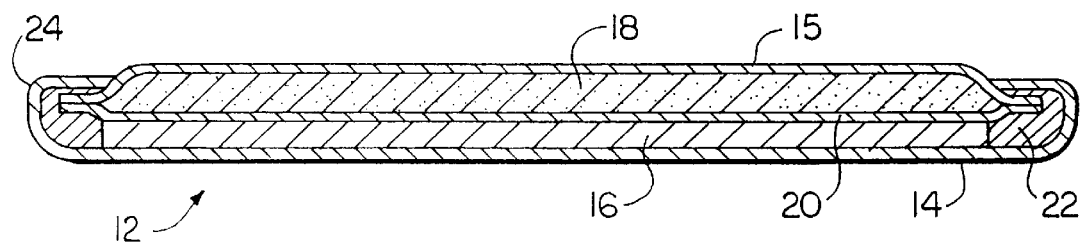
FIGS. 1a and 1b are cross-sectional views showing the structure of either a coin cell-type lithium ion battery (1a), or a coin cell-type electrochemical capacitor (1b)

An electrochemical cell or battery of the invention includes, as an electrolyte, a non-aqueous electrolyte of the invention. Referring to FIG. 1a, such a cell 12 has, within a conductive container 14 and cover 15, an anode 16 and a cathode particle mix 18. A separator 20 which includes an electrolyte is placed between the anode and the mix. Container 14 is crimped at the edges 24 capturing cover 15 under an insulating gasket 22. Cells so formed may be configured for either parallel or series operation.

Figure 1B:
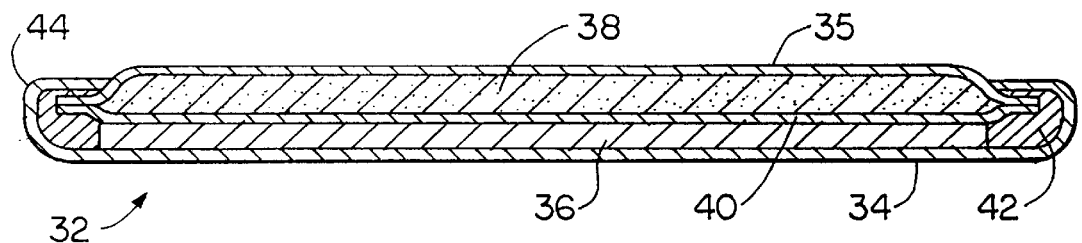
Figure 2A:
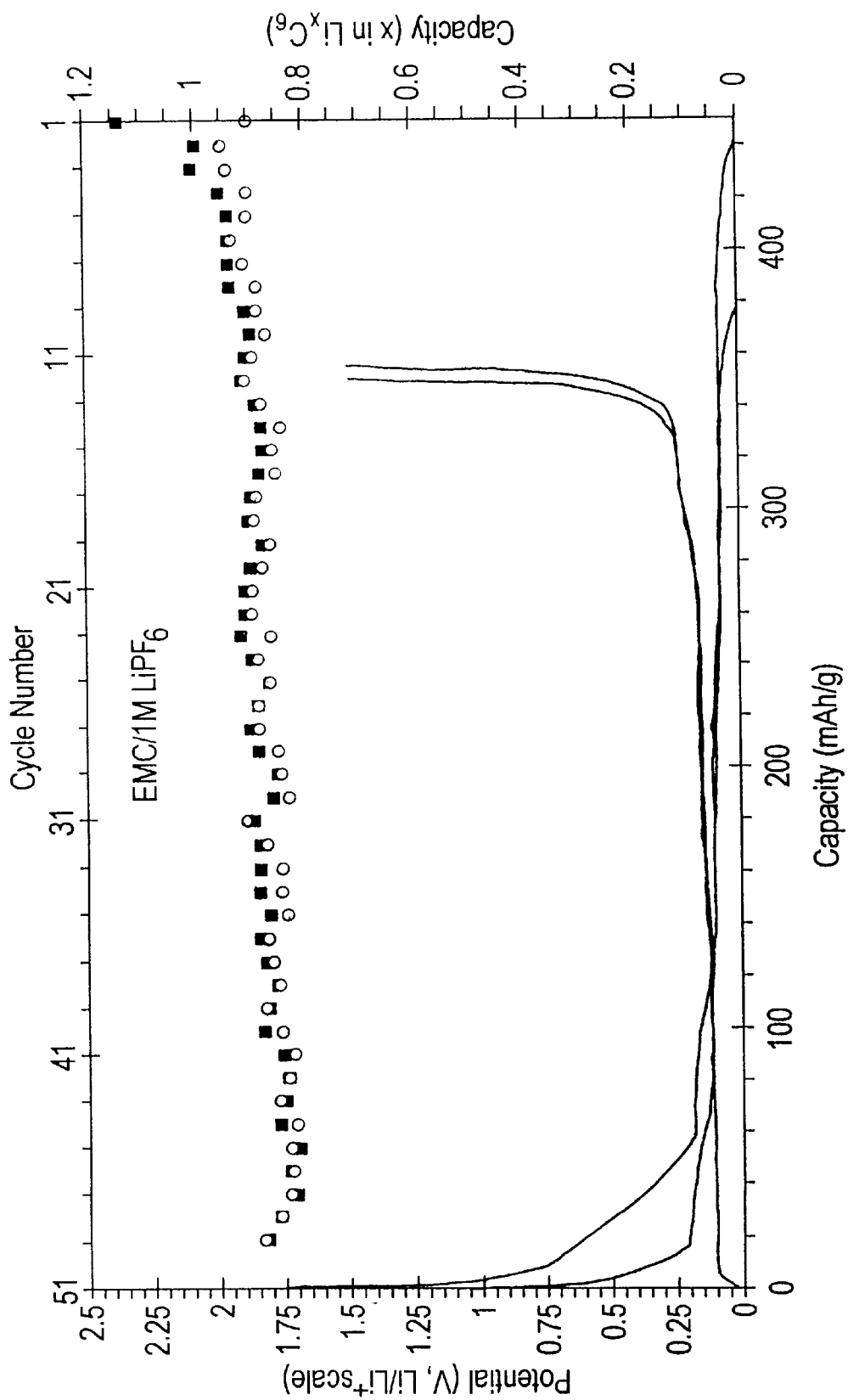
FIGS. 2a to 2d present four graphs of voltage vs. the Li+ ion intercalation capacity of a graphite anode determined in four different asymmetric alkyl methyl carbonate electrolytes, each 1M in $LiPF_6$.
Figure 2B:
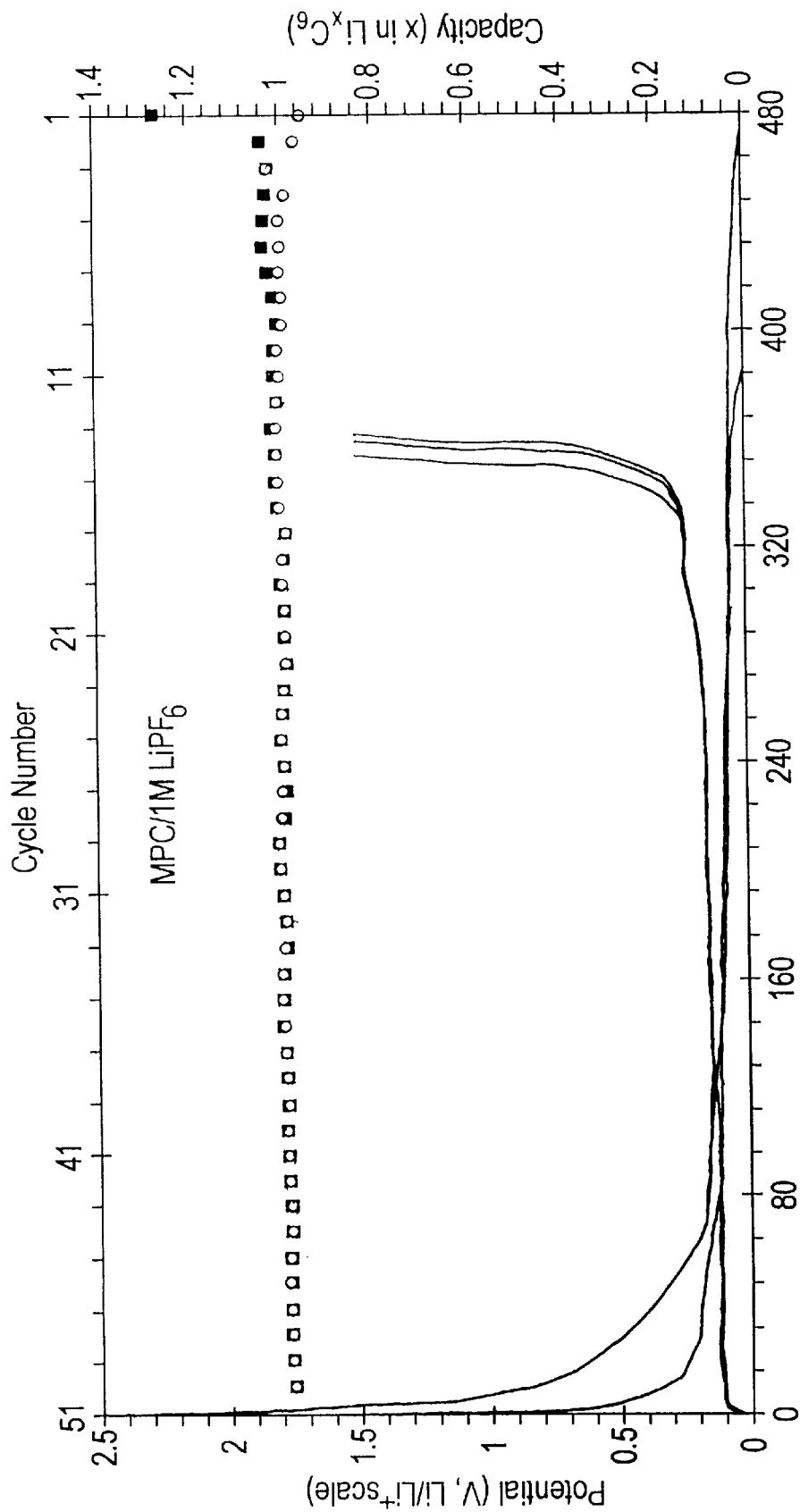
Figure 2C:
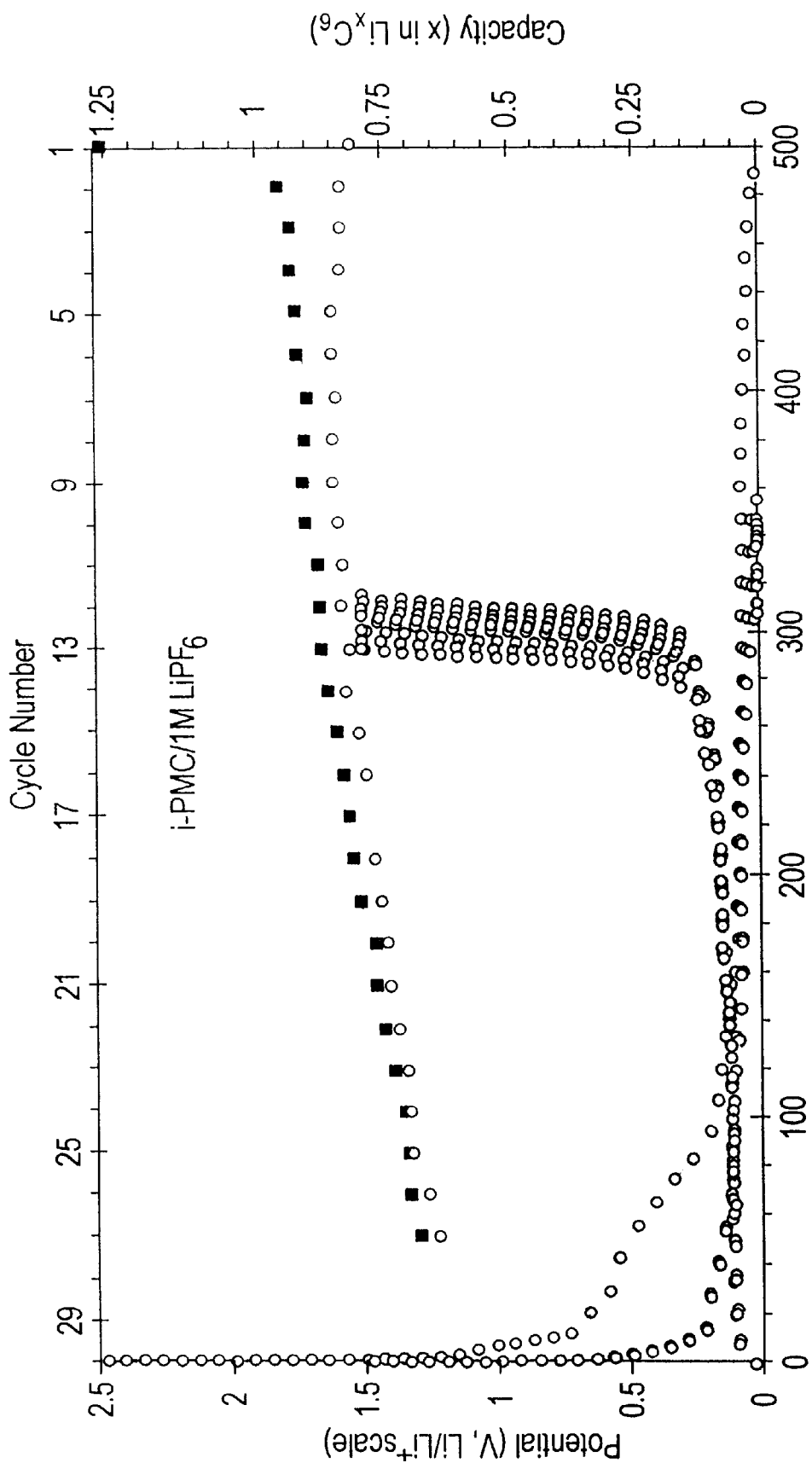
Figure 2D:
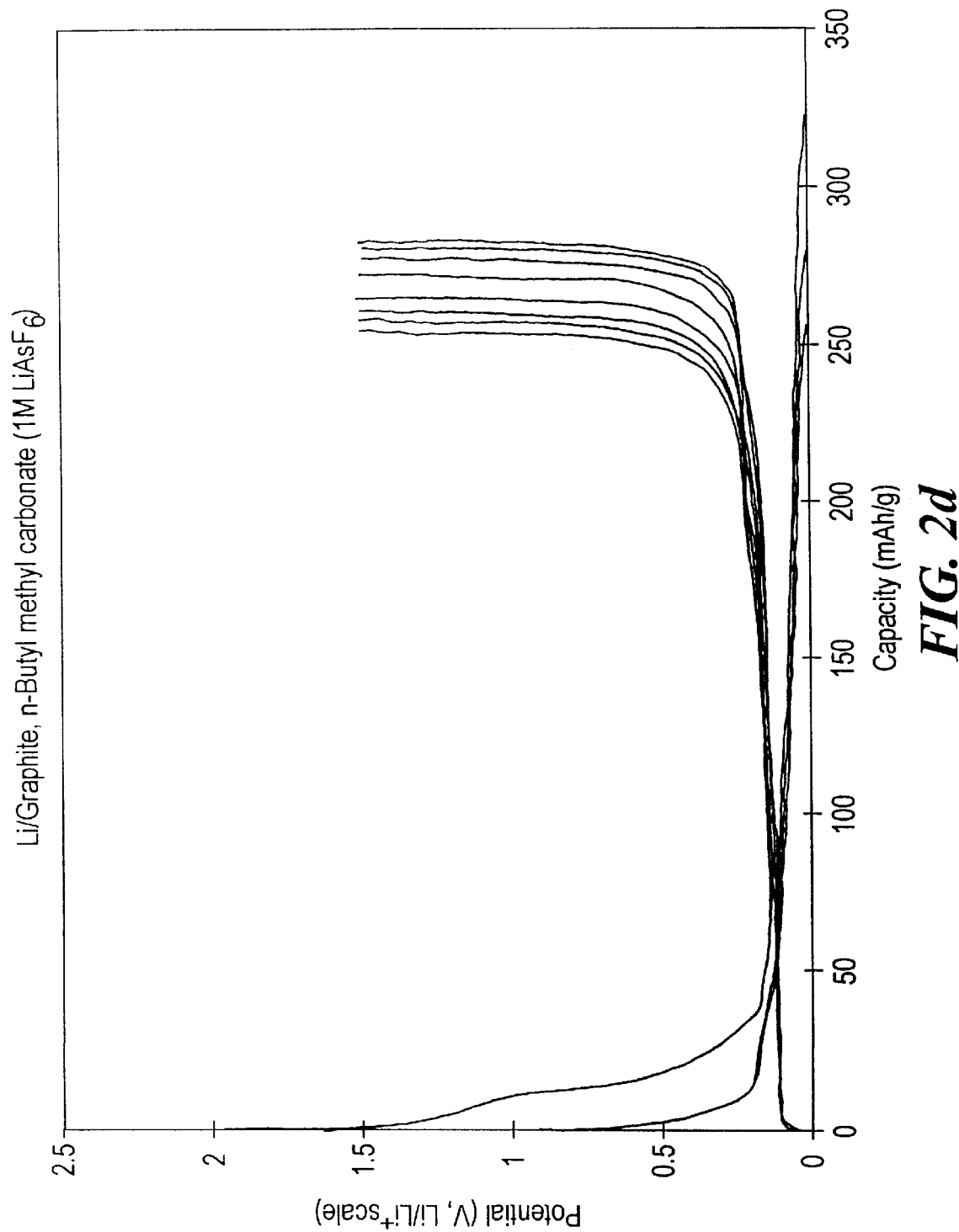

An electrochemical capacitor of the invention similarly includes a non-aqueous electrolyte of the invention and is configured as shown in FIG. 1b. An electrochemical capacitor is an electrochemical storage device in which electric charge is stored in the electrical double-layer formed at the interface between a polarizable electrode and an electrolyte solution when DC voltage is applied. Referring to FIG. 1b, such a cell 32 has, within a conductive container 34 and cover 35, two electrodes 36 and 38 which may be composed of the same material or different materials. A separator 40 which includes an electrolyte is place between the two electrodes. Container 34 is crimped at the edges 44, capturing cover 35 under an insulating gasket 42. Cells so formed may be configured for either parallel or series operation.

All of the asymmetric alkyl methyl and ethyl carbonate solvents used in the electrolyte of the invention were synthesized by the general reaction, well-known to those of skill in the art, of an alkyl chloroformate, RO—COCl, with an alkyl alcohol, R'OH, in the presence of pyridine, all dissolved in methylene chloride as shown in Equation 1:

$$ROCOCl + R'OH \rightarrow RO\text{—}CO_2R' + HCl \qquad (Eq.\ 1)$$

The asymmetric alkyl carbonate products were purified by two sequential distillations under an argon atmosphere, and were found to be >99.95% pure by gas-liquid chromatography measurements. The residual water content of these asymmetric alkyl carbonates was found to be less than 20 ppm.

EXAMPLE 1
Synthesis of n-Butyl Methyl Carbonate

Methyl chloroformate (103 ml; 97 g; 1.33 mol) was added in a dropwise manner over ≈2 hours to a magnetically stirred, ice cold solution of 1-butanol (120 ml; 97 g; 1.31 mol) and pyridine (108 ml; 106 g; 1.34 mol) in methylene chloride (1000 ml). A precipitate (pyridinium chloride) formed during the addition. The mixture was stirred overnight at ambient temperature and then was diluted with water (500 ml). The two phases were separated and the $CH_2Cl_2$ solution was extracted with 5% HCl (2×250 ml), $H_2O$ (2×250 ml), and saturated aqueous NaCl (250 ml). The organic solution was dried with $MgSO_4$, filtered, and concentrated on a rotary evaporator. The crude product was distilled through a Vigreux column under argon to give 156.5 g (1.18 mol; 90%) of n-butyl methyl carbonate as a clear, colorless liquid; bp 150–153° C. Redistillation under argon afforded 147.2 g (1.11 mol; 85%) of product, bp 152–153° C. IR (neat; NaCl plates) 2962, 2875, 1751 (C=O stretch), 1444, 1275, 939, 793 $cm^{-1}$.

Table 1 shows various physical properties of a group of alkyl methyl carbonates including the experimentally determined boiling and freezing points of the newly synthesized solvents.

Table 1: Selected physical properties of alkyl methyl carbonate solvents

TABLE 1

| | Selected physical properties of alkyl methyl carbonate solvents | | | | |
|---|---|---|---|---|---|
| Solvent Formula | MW g/mol | f.p., ° C. | b.p., ° C. | density(s) g/cm³ | viscosity, cP |
| MeO—CO₂Me (DMC) | C₃H₄O₃ (90) | 4 | 90 | 0.9764 | 0.59 (a) |
| MeO—CO₂Et (EMC) | C₄H₈O₃ (104) | −55 | 107 | 1.0070 | 0.66 (a) |
| MeO—CO₂Pr (MPC) | C₅H₁₀O₃ (118) | −49 | 130 | 0.9795 | 0.90 (b) |
| MeO—CO₂iPr (MiPC) | C₅H₁₀O₃ (118) | −75 | 117 | 0.9668 | 0.80 (b) |
| MeO—CO₂Bu (BMC) | C₆H₁₂O₃ (132) | −55 | 153 | — | — |
| MeO—CO₂iBu (iBMC) | C₆H₁₂O₃ (132) | −61 | 142 | — | — |

(a) measured at 25° C.
(b) measured at 19° C.

Table 1 demonstrates the significant range of freezing points of the asymmetric alkyl methyl carbonates tested, thereby illustrating the useful temperature range of these asymmetric solvents when used as the sole solvent in formulating electrolytes for capacitors and batteries.

Additionally, the asymmetric alkyl carbonates also provide a wide liquidus range which is defined as the difference in temperature between the boiling point and the freezing point for a particular solvent. For example, methyl isopropyl carbonate (MiPC) remains in the liquid state over a 183° C. range while its symmetric isomer with an identical molecular weight, diethyl carbonate (DEC), remains in the liquid state over a smaller 170° C. range (5). A wide liquidus range for a non-aqueous electrolyte is highly desirable for both battery and capacitor applications.

EXAMPLE 2

That asymmetric alkyl methyl carbonates are sufficient for the proper functioning of a lithium-ion battery was demonstrated as follows: We prepared and cycled four different asymmetric alkyl carbonate electrolytes against a graphite anode in order to ascertain the ability of these new solvents to form a suitable film on the graphite surface, thereby allowing a lithium ion battery to perform with a high capacity and long cycle life. The four electrolytes were: EMC, MPC, MiPC and BMC, all 1M in $LiPF_6$.

FIGS. 2a–d present the potential (V) vs. capacity (mAh/g) and the cycle life behavior [capacity (x in $LixC_6$ vs. cycle number] of graphite electrodes cycled against a Li metal counter electrode in electrolytes consisting of EMC (FIG. 2a), MPC (FIG. 2b), MiPC (FIG. 2c), and BMC (FIG. 2d) All of the cells were cycled between the potential limits of 1.50 and 0.001 V vs. Li+/Li at a current density of from 100 to 200 $\mu A/cm^2$. This corresponds to a charge/discharge rate of ~C/20. The electrochemical behavior of the graphite electrodes cycled in all four asymmetric alkyl methyl carbonate electrolytes is seen to be very good indeed.

EXAMPLE 3

Figure 3A:
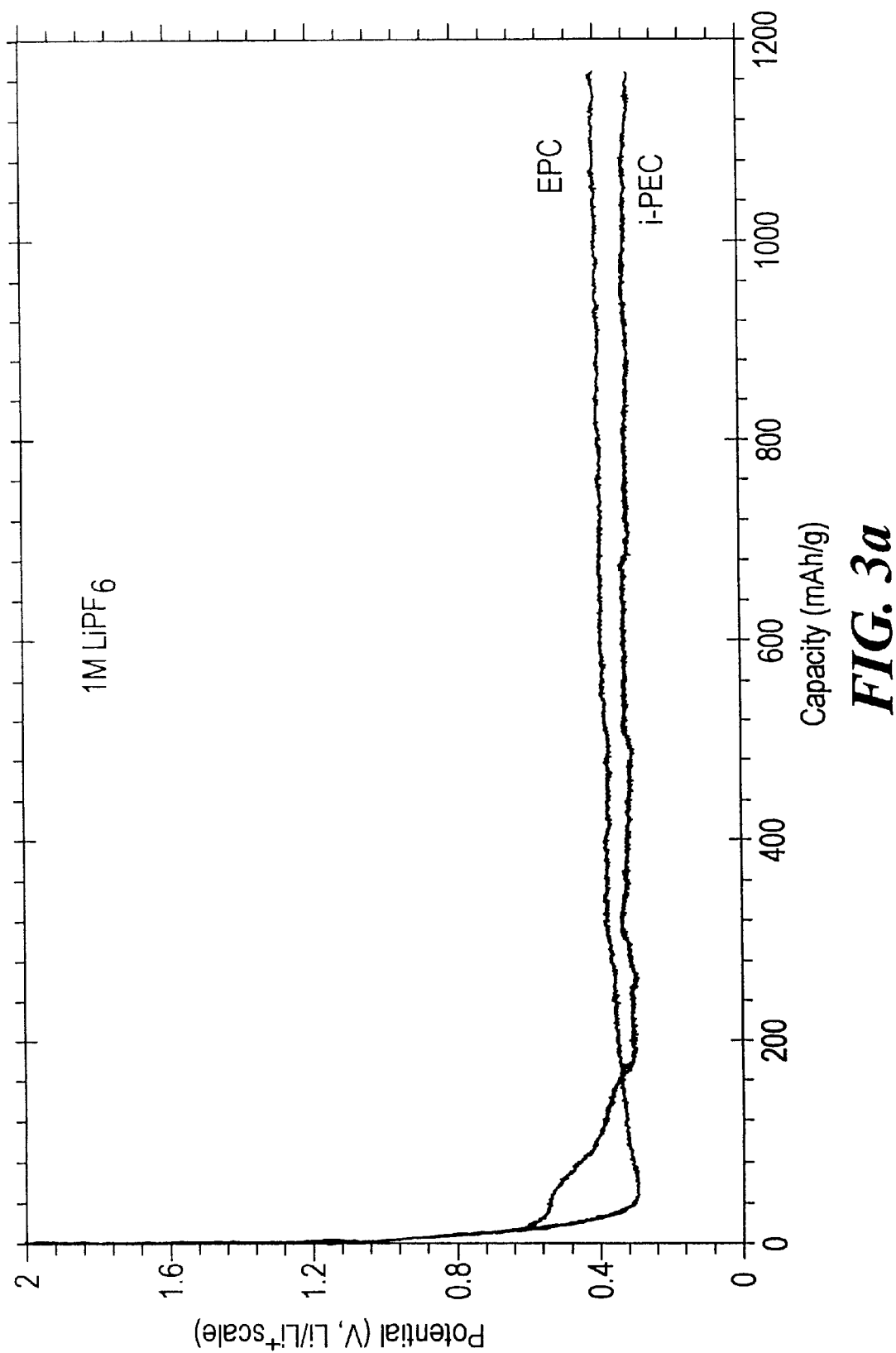
FIGS. 3a and 3b present two graphs of voltage vs. the Li+ ion intercalation capacity of a graphite anode to compare the performances of asymmetric alkyl methyl carbonates with alkyl ethyl carbonates, each 1M in $LiPF_6$.
Figure 3B:
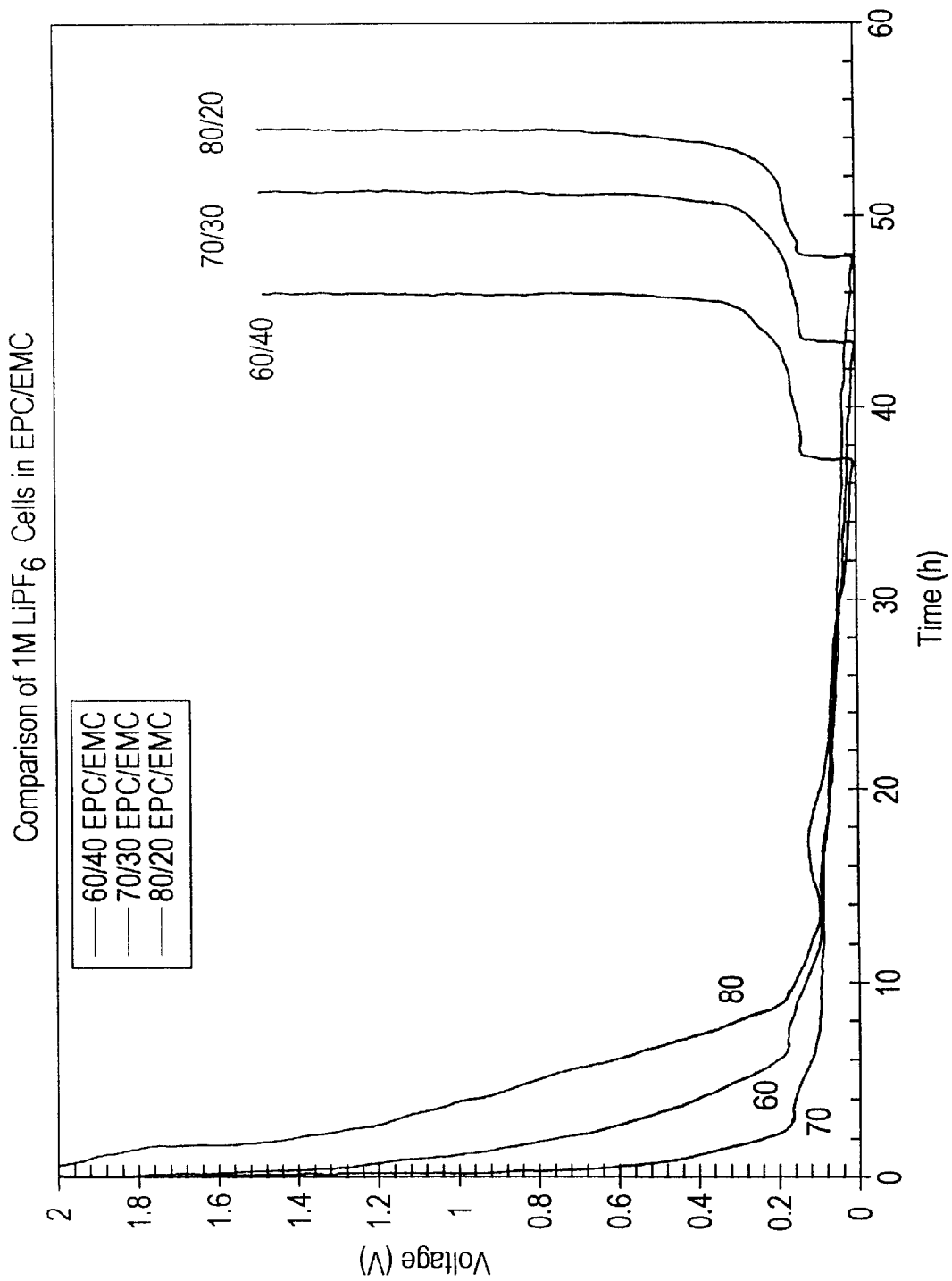

To demonstrate that asymmetric alkyl methyl carbonates are necessary for the proper functioning of a lithium ion battery and the efficacy of alkyl methyl carbonates as suitable anode film-formers in the presence of alkyl ethyl carbonates, we first determined the cycling capacity of alkyl ethyl carbonates alone. FIG. 3a shows that electrolytes consisting of the alkyl ethyl carbonate solvents EPC and EiPC, when tested as above, could not be cycled at all. However, referring to FIG. 3b, the addition of increasing proportions of EMC to an EPC electrolyte, 1M in $LiPF_6$, restores the cycling capacity. Specifically, as seen in FIG. 3b, as the ratio of EMC to EPC increases from 1:4 to 2:3, the corresponding reversible capacity between 0.2 and 0.4 volts effectively doubles. Moreover, the irreversible capacity that accompanies the first intercalation process is dramatically reduced as the amount of alkyl methyl carbonate (e.g., EMC) is increased. This trend demonstrates the importance of using alkyl methyl carbonates as the primary solvent in order to maintain a stable solid electrolyte interface (SEI) on the carbon anode. Based on these results, it is expected that a minimum amount of at least a 10 vol % of an alkyl methyl carbonate should be included in the electrolyte of a lithium ion battery as the primary solvent. These data clearly demonstrate the need for the MeO— functionality in any electrolyte formulation for lithium ion battery applications.

EXAMPLE 4

The ability of asymmetric alkyl carbonates to provide excellent performance, particularly at low temperature, in electrochemical capacitors comprising an electrolyte consisting of 2M $EMIPF_6$/methyl propyl carbonate is demonstrated by the data in Table 2.

Table 2: Performance of a parallel plate capacitor as a function of temperature

TABLE 2

| Performance of a parallel plate capacitor as a function of temperature | |
|---|---|
| Temperature, ° C. | Capacitance, Farads |
| 27 | 8.4 |
| −22 | 6.0 |
| −60 | 1.0 |

A very small loss of capacitance was observed on dropping the temperature to −22° C. Indeed, the asymmetric alkyl carbonate-based electrolyte allowed the capacitor still to function at −60° C. This temperature is five degrees below the military specification for capacitors wherein the capacitor is not expected to function, but simply to survive the low temperature excursion.

EXAMPLE 5

Figure 4:
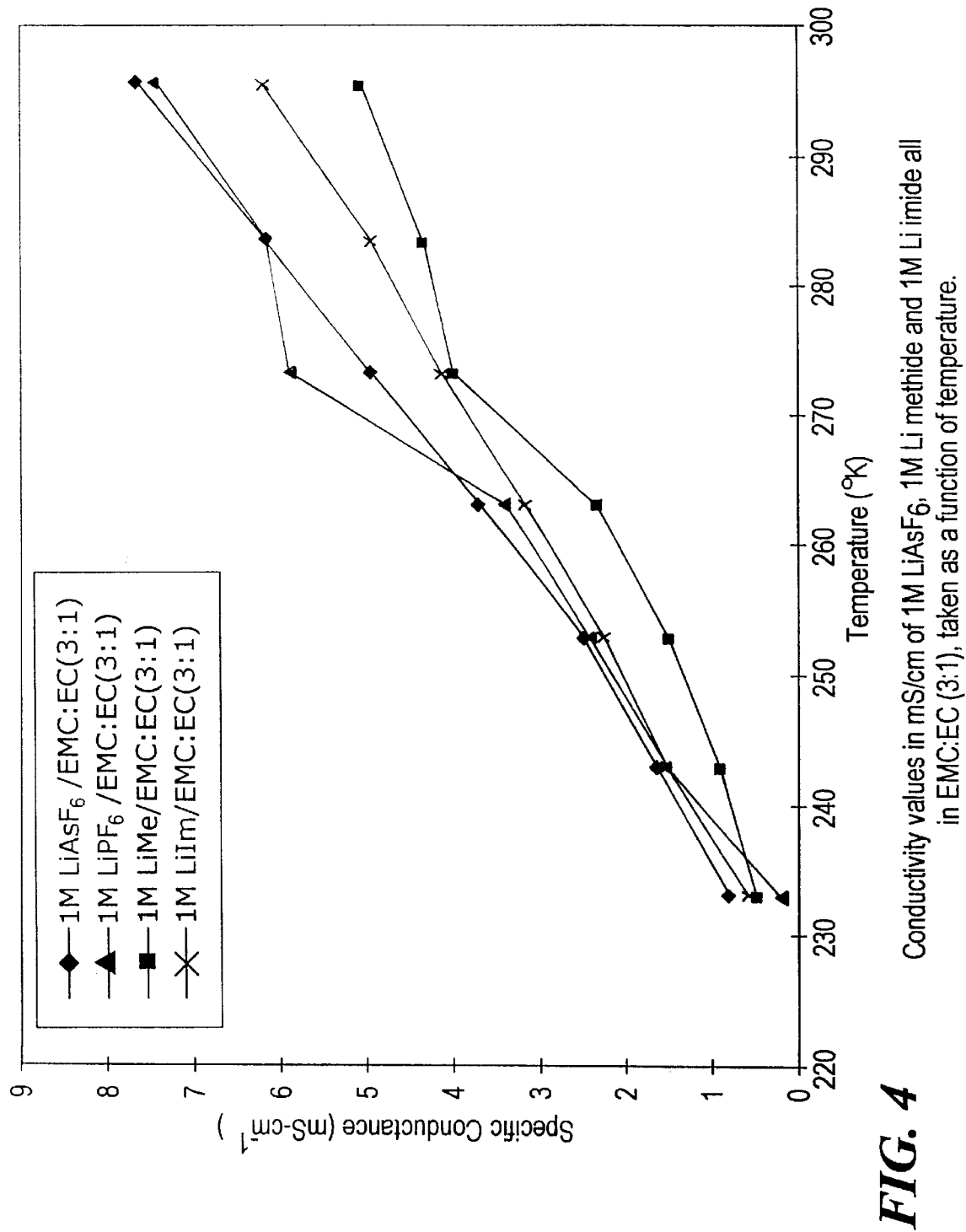
FIG. 4 shows conductivity values in mS/cm of various 1M $Li^+$ salts in EMC:EC (3:1) taken as a function of temperature.

FIG. 4 shows how an acyclic, asymmetric alkyl methyl carbonate such as EMC can serve as a primary solvent in the presence of a small amount (25%) of a secondary solvent (in this case, the cyclic solvent ethylene carbonate). The use of different lithium salts in the solvent mixture can cause the conductance of the EMC-based electrolytes to vary over a 65° C. range. Even at the low temperature of 233° K. (−40° C.), all of the electrolytes manifest specific conductances around 0.5 mS/cm, a value high enough for commercial applications, such as laptop computer and cellular phone operation.

In the example above, EMC was used at a vol % of greater than 70%, with the balance of the electrolyte solvent being EC. In other embodiments, in particular with EC, PC or BC, as the secondary solvent, a significantly smaller vol % of the alkyl methyl carbonate, for example less than 25%, can be used.

From the results illustrated in the Examples, it is clear that asymmetric alkyl methyl carbonate solvent electrolytes as disclosed herein are extremely valuable for commercial applications when used either singly, or in combinations of two or more asymmetric alkyl methyl carbonate solvents, or in specified combinations with other alkyl carbonate or alkyl ester solvents, providing excellent capacity and cycle life, e.g., against graphite electrodes in lithium ion battery applications. In other applications, any other cabonaceous or amorphous metal oxide anode could be used. In addition, the described electrolytes have a wide liquidus range and are particularly useful at low temperature.

It is understood that various other modifications will be apparent to and can readily be made by those skilled in the art without departing from the scope and spirit of this invention. Accordingly, it is not intended that the claims appended herein be limited to description as set forth herein, but rather that the claims be construed as encompassing all of the features of patentable novelty including all features that would be treated as equivalent thereof by those skilled in the art to which this invention pertains.

REFERENCES

1. H. J. Gores and J. M. G. Barthel, Pure & Appl. Chem, 67, 919 (1995).
2. H. Okana, et al., U.S. Pat. No. 5,525,433, Jun. 11, 1996.
3. H. Okuno, et al., U.S. Pat. No. 5,474,862, Dec. 12, 1995.

4. Y. Shoji, et al., Jpn. Kokai Tokkyo Koho JP 08115742 A2 7, May 1996.
5. L. A. Dominey in "Lithium Batteries", G. Pistoia, ed., Elsevier, N.Y., 1994, p. 160.

What is claimed is:

1. A non-aqueous electrolyte comprising
   a salt; and
   a non-aqueous organic solvent, said non-aqueous organic solvent consisting of one or more asymmetric alkyl methyl carbonates, each said one or more asymmetric alkyl methyl carbonate having no more than six carbon atoms.

2. The non-aqueous electrolyte of claim 1, wherein said salt is a lithium salt.

3. The non-aqueous electrolyte of claim 2, wherein said salt is selected from the group consisting of $LiBF_4$, $LiPF_6$, $(CF_3SO_2)_2NLi$ and $(CF_3SO_2)_3CLi$.

4. The non-aqueous electrolyte of claim 1, wherein said salt is a non-lithium salt.

5. The non-aqueous electrolyte of claim 4, wherein said salt is selected from the group consisting of $EMIBF_4$, $EMIPF_6$, $(CF_3SO_2)_2NEMI$ and $(CF_3SO_2)_3CEMI$.

6. The non-aqueous electrolyte of claim 1, wherein said asymmetric alkyl methyl carbonate is of the form $MeO—CO_2R$, where R is selected from the group consisting of ethyl, propyl, iso-propyl, butyl, iso-butyl and sec-butyl.

7. The non-aqueous electrolyte of claim 6 wherein R is iso-butyl or sec-butyl.

8. An electrochemical cell comprising
   a carbonaceous anode;
   a cathode; and
   an electrolyte, wherein said electrolyte is the non-aqueous electrolyte of claim 1 and wherein the salt in said electrolyte is a lithium salt.

9. A non-aqueous electrolyte comprising
   a salt; and
   a non-aqueous organic solvent, said non-aqueous organic solvent comprising a solvent mixture of iso-butyl methyl carbonate or sec-butyl methyl carbonate, or a combination thereof, for use as a primary solvent, and at least one kind of alkyl carbonate or alkyl ester as a secondary solvent, said secondary solvent alkyl carbonate being selected from the group consisting of cyclic, acyclic, linear, branched, symmetric and asymmetric alkyl carbonates of the form $ROCO_2R'$, where R and $R'=C_{1-4}$, said secondary solvent alkyl ester being selected from the group consisting of cyclic, acyclic, linear, branched, symmetric and asymmetric alkyl esters of the form $RCO_2R'$, where $R=C_{0-4}$ and $R'=C_{1-4}$.

10. The non-aqueous electrolyte of claim 9, wherein said secondary solvent is at least one kind of cyclic alkyl carbonate selected from the group consisting of ethylene carbonate, propylene carbonate and butylene carbonate.

11. The non-aqueous electrolyte of claim 9, wherein said salt is a lithium salt.

12. The non-aqueous electrolyte of claim 11, wherein said salt is selected from the group consisting of $(CF_3SO_2)_2NLi$ and $(CF_3SO_2)_3CLi$.

13. The non-aqueous electrolyte of claim 9, wherein said salt is a non-lithium salt.

14. An electrochemical cell comprising
    a carbonaceous anode;
    a cathode; and
    an electrolyte, wherein said electrolyte is the non-aqueous electrolyte of claim 9, said non-aqueous electrolyte comprising a lithium salt and at least 10 vol % of said primary solvent asymmetric alkyl methyl carbonate.

15. A capacitor comprising
    a first electrode;
    a second electrode; and
    an electrolyte, said electrolyte comprising
       a salt; and
       a non-aqueous organic solvent, said non-aqueous organic solvent consisting of one or more asymmetric alkyl methyl carbonates, each said one or more asymmetric alkyl methyl carbonate having no more than six carbon atoms, wherein the salt in said electrolyte is a non-lithium salt.

16. A non-aqueous electrolyte comprising
    a salt selected from the group consisting of $EMIBF_4$, $EMIPF_6$, $(CF_3SO_2)_2NEMI$ and $(CF_3SO_2)_3CEMI$; and
    a non-aqueous organic solvent, said non-aqueous organic solvent comprising a solvent mixture of one or more asymmetric alkyl methyl carbonates for use as a primary solvent, each said primary solvent asymmetric alkyl methyl carbonate having no more than six carbon atoms, and at least one kind of alkyl carbonate or alkyl ester as a secondary solvent, said secondary solvent alkyl carbonate being selected from the group consisting of cyclic, acyclic, linear, branched, symmetric and asymmetric alkyl carbonates of the form $ROCO_2R'$, where R and $R'=C_{1-4}$, said secondary solvent alkyl ester being selected from the group consisting of cyclic, acyclic, linear, branched, symmetric and asymmetric alkyl esters of the form $RCO_2R'$, where $R=C_{0-4}$ and $R'=C_{1-4}$.

17. A capacitor comprising
    a first electrode;
    a second electrode; and
    an electrolyte, said electrolyte comprising
       a salt; and
       a non-aqueous organic solvent, said non-aqueous organic solvent comprising a solvent mixture of one or more asymmetric alkyl methyl carbonates for use as a primary solvent, each said primary solvent asymmetric alkyl methyl carbonate having no more than six carbon atoms, and at least one kind of alkyl carbonate or alkyl ester as a secondary solvent, said secondary solvent alkyl carbonate being selected from the group consisting of cyclic, acyclic, linear, branched, symmetric and asymmetric alkyl carbonates of the form $ROCO_2R'$, where R and $R'=C_{1-4}$, said secondary solvent alkyl ester being selected from the group consisting of cyclic, acyclic, linear, branched, symmetric and asymmetric alkyl esters of the form $RCO_2R'$, where $R=C_{0-4}$ and $R'=C_{1-4}$, wherein the salt in said electrolyte is a non-lithium salt.

18. The capacitor of claim 17 wherein, in said electrolyte, said salt is selected from the group consisting of $EMIBF_4$, $EMIPF_6$, $(CF_3SO_2)_2NEMI$ and $(CF_3SO_2)_3CEMI$.

19. The capacitor of claim 17 wherein, in said electrolyte, said primary solvent asymmetric alkyl methyl carbonate is of the form $MeO—CO_2R$, where R is selected from the group consisting of ethyl, propyl, iso-propyl, butyl, iso-butyl and sec-butyl.

20. The capacitor of claim 17 wherein, in said electrolyte, R is butyl, iso-butyl or sec-butyl.

21. The capacitor of claim 17 wherein, in said electrolyte, said secondary solvent is at least one kind of cyclic alkyl carbonate selected from the group consisting of ethylene carbonate, propylene carbonate and butylene carbonate.

22. A non-aqueous electrolyte comprising
a salt selected from the group consisting of $EMIBF_4$, $EMIPF_6$, $(CF_3SO_2)_2NEMI$ and $(CF_3SO_2)_3CEMI$; and
a non-aqueous organic solvent, said non-aqueous organic solvent comprising a solvent mixture of one or more asymmetric alkyl methyl carbonates for use as a primary solvent, each said primary solvent asymmetric alkyl methyl carbonate having no more than six carbon atoms, and at least one kind of alkyl carbonate or alkyl ester as a secondary solvent, said secondary solvent alkyl carbonate being selected from the group consisting of cyclic, acyclic, linear, branched, symmetric and asymmetric alkyl carbonates of the form $ROCO_2R'$, where R and $R'=C_{1-4}$, said secondary solvent alkyl ester being selected from the group consisting of cyclic, acyclic, linear, branched, symmetric and asymmetric alkyl esters of the form $RCO_2R'$, where $R=C_{0-4}$ and $R'=C_{1-4}$.

* * * * *